Figure 1:
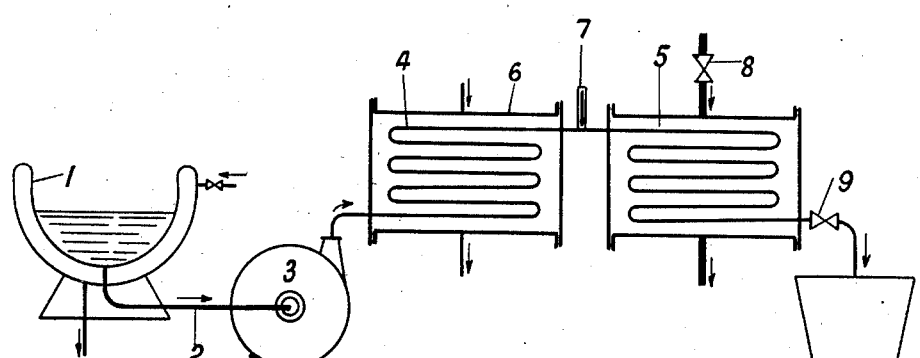

April 14, 1931.  S. GRASSE  1,801,152

PROCESS OF TREATING CREAM

Filed Jan. 18, 1929

INVENTOR
Samuel Grasse
BY
Rennie Davis Marvin Edmonds
ATTORNEYS

Patented Apr. 14, 1931

1,801,152

UNITED STATES PATENT OFFICE

SAMUEL GRASSE, OF GLASGOW, SCOTLAND

PROCESS OF TREATING CREAM

Application filed January 18, 1929, Serial No. 333,495, and in Great Britain January 18, 1928.

The present invention relates to the treatment of cream. More particularly it relates to the treatment of cream of relatively high butter fat content, and has for its object the provision of an improved process and apparatus for sterilizing cream.

The general principle of sterilizing certain fluids by subjecting them to a high temperature and a suitable pressure is, of course, not new. It has been widely applied to the treatment of milk, and though it has found expression in various processes which have been advanced from time to time as improvements, it is most generally embodied at the present time in a treatment wherein the milk is forced with the aid of a pump through a conduit or system of conduits, in which the heating and subsequent cooling are effected rapidly and under pressure. Little if any satisfactory application of the above mentioned principle, however, has ever been made to the sterilization of cream or double cream, as cream with a butter fat content of 45% or more is generally known commercially.

The sterilization of milk, or a very thin quality of cream, and the sterilization of cream or double cream present entirely different problems. Being quite fluid, there is little or no likelihood of milk churning during its passage through a pump such as is used with the common forms of milk sterilization apparatus. On the other hand, unless certain conditions are established, as will subsequently be explained, such a pump produces a churning effect upon cream and destroys the uniformity of its consistency.

Furthermore, if cream be subjected to the high temperatures deemed necessary for effective sterilization of milk, or be unduly exposed to such a temperature, the fat globules will burst, thereby adversly affecting the fresh, natural qualities of the cream and imparting to it a boiled or scalded flavor. In the case of double cream, this effect of temperature is particularly important because commercial usage demands the retention not only of the natural taste, flavor and consistency, but also the retention of good whipping qualities. Extreme temperatures, whether of heat or cold, or sudden changes in temperature, injuriously affect these qualities and consequently must be avoided if a satisfactory product is to be obtained.

The extent of the necessary heating period is likewise different for cream than it is for milk. Heat is more readily transmitted through fluid milk than it is through viscous cream, with the result that milk can be raised to a sufficiently high sterilization temperature in a much shorter time than cream. In some instances, a heating period of two seconds is sufficient for milk. Cream, on the other hand, may require as much as 2-3 minutes to insure the passage of heat through every particle of it.

With the view of satisfactorily solving these problems encountered in the sterilization of cream and in the application to the sterilization of cream of such processes as have found wide use in the similar treatment of milk, I have devised the present invention. According to the invention, cream of relatively high butter fat content is sterilized, by the use of thermal and mechanical means alone, in such a manner as to retain substantially all of its natural properties and qualities and to prevent loss by evaporation during treatment. The process may be applied to freshly separated cream immediately after its issuance from the separator, in which case the separation and sterilization may be conducted as a single continuous process. On the other hand, the process is also applicable to the regeneration of cream previously separated and accumulated, whereby cream that has been allowed to stand long enough to have developed a relatively high percentage of acidity, but not high enough to make the acidity perceptible to taste or smell, may be effectively sterilized with little or no ill effects and so have arrested the further development of acidity which otherwise would have taken place.

According to the process of the invention, cream of high butter fat content about to be sterilized by the operation of passing it under pressure with the aid of a pump through a continuous and closed conduit in which it is raised to a sterilization temperature and then cooled to ordinary temperature, is first preheated at a temperature such that the cream resists the tendency to form butter when subjected to the pressure and the churning action of the pump.

For the conduct of the process there is provided according to the invention, a suitable pump-fed sterilizing apparatus of the continuous flow type so constructed that cream passed through the apparatus by the pump under pressure is first heated and then cooled. Suitable apparatus for preheating the cream likewise is provided together with a connection to the pump such that the pump will suck up cream at the proper temperature and pass it under pressure through the sterilizing apparatus, which is operable concomitantly with the pre-heating apparatus.

In carrying out the process of the invention, the cream at normal atmospheric pressure and by any suitable means is raised to a temperature sufficient to bring it to a good state of fluidity, preferably to about blood heat. I find that on so preheating cream or double cream, all or nearly all churning effects by subsequent pump action are avoided and there is the further advantage that too large and sudden a change is obviated when the cream is subsequently raised to the relatively high sterilizing temperature. To further insure the maintenance of uniform consistency, as well as to provide suitable aeration, the preheated cream may be kept in a state of gentle agitation.

The arrangement and construction of suitable apparatus for accomplishing the preheating of the cream may vary somewhat, depending on the conditions and requirements of the particular installation in which it is to be used. According to one practical embodiment of the invention, a double jacket vat or reservoir of suitable size and shape may be employed, between the walls of which the heating medium is allowed to pass continuously. To maintain the cream in a state of agitation, suitable stirring devices may be fitted to the vat. Regulating mechanism likewise may be provided whereby the amount of heating medium circulated is controlled so as to maintain the cream at or near the required temperature. If desired, the regulating apparatus may be made to operate automatically.

To effect sterilization, the cream, preheated and maintained in a state of agitation as described, is caused to flow continuously under pressure through a tubular heater of uniform bore wherein the temperature is raised to the desired value. A suitable pump can be advantageously employed to develop the desired initial pressure, which may be about 2½ atmospheres per square inch, and the heater is preferably so constituted that the pressure at its outflow will be about 2 atmospheres per square inch and the temperature a maximum of about 245° F. Any suitable heating medium such as steam, hot air, hot water or the like, may be used and the period of heating preferably should not exceed three minutes.

From the heater, the cream is passed under the pressure derived from the pump and without exposure to atmosphere, through a tubular cooler of substantially the same internal diameter as the heater. Preferably, the temperature in the cooler should at no point be below 32° F., but should be nearer 35° F. at the outlet end of the cooler and rising in value toward the inlet end.

Figure 2:
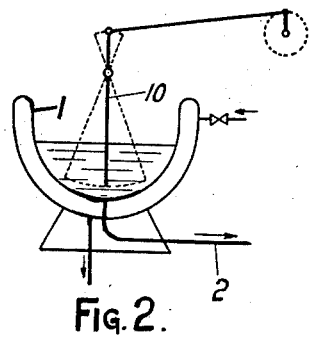

For a better understanding of the invention, reference is made to the accompanying drawings wherein:

Fig. 1 is a diagrammatic illustration of suitable apparatus in accordance with the invention, and Fig. 2 is a diagrammatic illustration showing a modification.

Referring to the drawings more in detail, a cream reservoir 1 is connected by a pipe 2 of suitable bore to a pump 3 which sucks the cream from the reservoir and passes it through a tubular heating system 4 and a tubular cooling system 5, arranged as a continuous conduit.

As shown, the cream reservoir 1 is double jacketed and furnished with suitable inlet and outlet connections for the passage of a heating medium. For the control of the heating medium, a suitable regulating device 11 is provided to insure the maintenance of the cream at or near the required temperature.

From the reservoir the cream passes to the pump 3 which may be of any suitable form although a centrifugal pump working at a speed which, for the dimensions of the pump used, will develop a maximum pressure of about 2½ atmospheres, is preferable. At or near the discharge end of the whole system is inserted a pressure controlled valve 9 or cock, by means of which the pressure in the system can be brought up to, but cannot exceed the full pump pressure of 2½ atmospheres.

The tubular heating and cooling elements 4 and 5 to which the cream is passed by the pump, may be of the usual type employed, for instance, in condenser practice, the various sections being made up of suitable lengths and forming a continuous conduit of about 1″ bore.

The heater coil 4 is enclosed in a suitable jacket 6 provided with inlet and outlet connections to permit the passage of a heating medium over and around the tubes. Adjacent the outlet end of the heater coil is arranged a thermometer 7 whereby the temperature of the cream as it issues from the heater can be gauged and the amount of heating medium circulated through the jacket properly regulated to maintain an outlet temperature of about 245° F.

The cooling coil 5 of the system is of the same or nearly the same bore as the heating coil and is enclosed in a suitable heat insulated jacket through which a cooling medium is circulated under the control of a regulating valve or cock 8. At its outlet end, the cooling coil terminates in a discharge arm fitted with a pressure control valve 9 and one or more discharge taps. To permit the passage of steam through the system for sterilizing the conduit, the discharge arm is provided with a suitable opening which can be closed by a cock or valve when desired.

According to the modification illustrated in Fig. 2, the reservoir is fitted with a suitably actuated mechanical stirring device 10 for maintaining the preheated cream in a state of gentle agitation prior to its passage to the pump.

The method of operation of the embodiment of the invention described above is as follows:

The cream conduit, which is continuous, is first sterilized by passing steam through it. Water is next pumped through the apparatus and is brought up to about 245° F. in the heater and then cooled in its passage through the cooler. The cream reservoir where the cream is preheated to and maintained at the requisite temperature and in a state of agitation as above described, is then put in communication with the pump and the cream following on the water is likewise raised to about 245° F. and subsequently cooled, all under a pressure of about, and preferably not below, 30 lbs. per square inch. When the last of the cream to be treated is about to pass the pump, the latter is again connected to water which thus follows up the cream and insures the discharge of all of the cream under pressure.

I claim:

1. A process for treating cream which comprises, passing cream at substantially blood heat temperature and under pressure to a continuous and closed conduit, heating the cream in said conduit to its sterilization temperature, and subsequently cooling the cream.

2. A process for treating cream which comprises, passing cream at substantially blood heat temperature and under pressure to a continuous and closed conduit, heating the cream in said conduit to its sterilization temperature for not more than three minutes, and subsequently cooling the cream.

3. A process for treating cream which comprises, passing cream at substantially blood heat temperature and under a pressure of substantially 2½ atmospheres per square inch to a continuous and closed conduit, heating the cream in said conduit to its sterilization temperature, and subsequently cooling the cream to a temperature not less than 32° F.

4. A process for treating cream which comprises, passing cream at substantially blood heat temperature and under pressure to a continuous and closed conduit, heating the cream in said conduit to substantially 245° F. for not more than three minutes, and subsequently cooling the cream.

5. A process for treating cream which comprises, passing cream at substantially blood heat temperature and under a pressure of substantially 2½ atmospheres per square inch to a continuous and closed conduit, heating the cream in said conduit to substantially 245° F. for not more than three minutes, and subsequently cooling the cream to not less than 32° F.

6. A process for treating cream which comprises, heating a body of cream to substantially blood heat temperature and maintaining it in a state of gentle agitation, passing said cream under pressure to a continuous and closed conduit, heating the cream in said conduit to its sterilization temperature, and subsequently cooling the cream.

7. In a process for treating cream which includes pumping cream under pressure through a continuous and closed conduit in which it is first heated to its sterilization temperature and then cooled, the steps of preheating the cream at substantially blood heat temperature and maintaining it in a state of gentle agitation prior to its passage to said conduit.

8. A continuous process for sterilizing cream which includes the steps of initially heating the cream to substantially blood heat temperature and at approximately atmospheric pressure, and from this temperature and pressure advancing the temperature to sterilization temperature and increasing the pressure to above atmospheric pressure.

9. A continuous process for sterilizing cream which includes the steps of initially heating the cream to substantially blood heat temperature and at approximately atmospheric pressure, and from this temperature and pressure advancing the temperature to substantially 245° F. and increasing the pressure to above atmospheric pressure.

10. A continuous process for sterilizing cream which includes the steps of initially heating the cream to substantially blood heat temperature and at approximately atmospheric pressure, and from this temperature and pressure advancing the temperature to substantially 245° F. and increasing the pressure to approximately 2½ atmospheres.

11. A continuous process for sterilizing cream which includes the steps of initially heating the cream to substantially blood heat and at approximately atmospheric pressure, from this temperature and pressure advancing the temperature to substantially 245° F. and increasing the pressure to approximately 2½ atmospheres, and maintaining this increased temperature and pressure for not more than three minutes.

12. The step of preparing cream for introduction into a sterilizing apparatus in which the cream is pumped through a conduit, which consists of preheating the cream under atmospheric pressure to approximately blood heat temperature.

In testimony whereof I affix my signature.

SAMUEL GRASSE.